United States Patent Office 3,118,897
Patented Jan. 21, 1964

3,118,897
PREPARATION OF CARBAZOLE COMPOUNDS
Karl Bernauer, Kilchberg, and Paul Karrer and Hans Schmid, Zurich, Switzerland, assignors to Hoffmann-La Roche Inc., Nutley, N.J., a corporation of New Jersey
No Drawing. Filed July 8, 1959, Ser. No. 825,641
Claims priority, application Switzerland July 25, 1958
9 Claims. (Cl. 260—294.7)

This invention relates to novel chemical processes. More particularly, it relates to methods for the preparation of compounds having the following general formula:

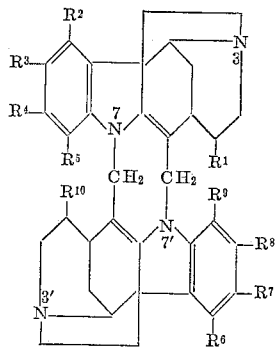

(I)

and to acid addition salts and quaternary salts thereof; wherein the symbols $R^1$ and $R^{10}$ represent hydrogen, lower alkyl, lower alkylidene, hydroxy(lower alkyl), hydroxy(lower alkylidene), lower alkoxy(lower alkyl), lower alkoxy(lower alkylidene), lower alkanoyloxy(lower alkyl) or lower alkanoyloxy (lower alkylidene), and the symbols $R^2$ to $R^9$ represent hydrogen, nitro, lower alkoxy or halogen. It will be understood that with respect to the acid addition salts and the quaternary salts referred to above, salt structure can be present at one or both of the tertiary nitrogen atoms in Formula I above.

Compounds under Formula I above in which each of the symbols $R^1$ and $R^{10}$ represent the hydroxyethylidene radical can appear (depending upon the method of preparation) in either the fully open form, Formula Ia below, or in mono- or bis-hemiacetal forms, respectively Formulas Ib and Ic below.

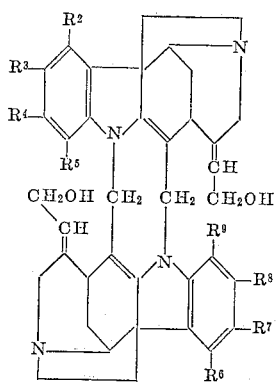

(Ia)

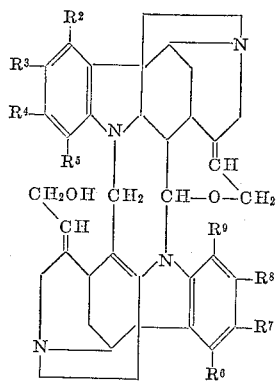

(Ib)

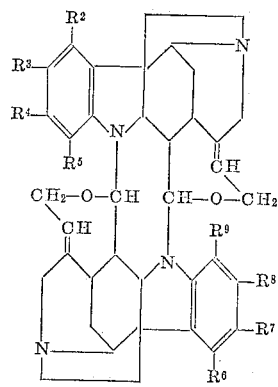

(Ic)

The symbols $R^2$ to $R^9$ in the above formulas have the same meanings indicated above.

The invention provides a process which comprises condensing a first aldehyde having the general formula:

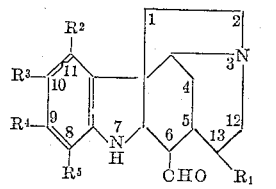

(II)

wherein the symbols $R^1$, $R^2$, $R^3$, $R^4$ and $R^5$ have the same meaning indicated above, with a second aldehyde having the same general formula, by heating. An appropriate method is to heat the materials in the presence of acid. It will be understood that the first and second aldehydes referred to above may be identical or different, provided only that they fall within the general Formula II. The nitrogen atom in position 3 can be converted, according to methods known per se, to an acid addition salt or quaternary salt thereof, either before or after the condensation step.

The aldehydes employed as starting materials can be obtained from naturally occurring Strychnos alkaloids. For example, the aldehyde according to the general Formula II wherein $R^1$ represents the ethylidene group and $R^2$ to $R^5$ represent hydrogen can be obtained by elimination of the primary hydroxyl group from the aldehyde obtained by Wieland and Gumlich from strychnine [Annalen der Chemie, volume 494, page 191 (1932)]. Those starting materials of Formula II above in which $R^1$ represents a β-hydroxyethlidene group are obtained, in cases where the molecular structure permits such an arrangement, at least partially in the form of their inner hemiacetals. This is particularly true in the case of the above mentioned Wieland-Gumlich aldehyde.

In the formulas set forth above, the symbol $R^1$ can represent hydrogen, a lower alkyl radical (e.g. methyl, ethyl or n-butyl), a lower alkylidene radical (e.g. ethylidene), or lower alkyl and lower alkylidene radicals containing a free or etherified or esterified hydroxyl group (e.g. β-hydroxyethylidene, β-acetoxyethylidene or β-methoxyethylidene). The symbols $R^2$ to $R^5$ can represent, for example, hydrogen, nitro, lower alkoxy (e.g. methoxy) or halogen (e.g. chlorine, bromine, iodine), and two neighboring symbols $R^2$ to $R^5$ can also represent, for example, a methylenedioxy bridge. Quaternizing agents suitable to prepare the quaternary salts referred to above are, for example, halides or sulfates of lower alkanols and lower alkenols or of araliphatic alcohols, e.g. methyl iodide, methyl bromide, allyl bromide, dimethyl sulfate and benzyl bromide. Acids useful to prepare the acid addition salts referred to above are pharmaceutically acceptable inorganic and organic acids, e.g. sulfuric, hydrochloric, hydrobromic, hydroiodic, phosphoric, oxalic, p-toluenesulfonic, methanesulfonic and picric acids. Suitable starting aldehydes under Formula I are, for example, 6 - formyl - 13-ethylidene-1,2,3a,4,5,6,6a,7-octahydro-3,5-ethano - pyrrolo[2,3-d]carbazole and 6-formyl-13-(2-hydroxyethylidene) - 1,2,3a,4,5,6,6a,7-octahydro-3,5-ethano-pyrrolo[2,3-d]carbazole.

Condensation is advantageously effected in the presence of an acid, preferably an organic acid, such as acetic, formis or oxalic acid, or of an acidic buffer, e.g. one having a pH range of 4–5. The reaction can be effected in a solvent, e.g. an organic acid, water, alcohol, or ethyl acetate. The acid selected as the condensing agent can appropriately serve also as the solvent, inasmuch as the basic aldehyde starting materials can easily be brought into solution with acids. It is preferred, for example, to use an aqueous acidic buffer solution or dilute aqueous acetic acid or anhydrous acetic acid, both as condensing agent and as solvent. It is indicated to effect the reaction with exclusion of oxygen and light.

According to one mode of execution of the invention, an aldehyde having the general Formula II above is first quaternized at the tertiary nitrogen atom. This reaction can be effected by methods known per se, suitably in the presence of a solvent, e.g. benzene. The thus formed quaternary salt of the aldehyde of Formula II is then subjected to the condensation reaction to produce a product responding to Formula I. The condensation is appropriately effected by heating the quaternary salt of the Compound II in acidic solution. According to a preferred mode of execution, the quaternary salt referred to is heated to a temperature between about 50° C. and about 100° C. in dilute acetic acid or in a mixture of glacial acetic acid and alkali metal acetate.

According to another mode of execution of the process of the invention, the aldehyde of Formula II is first subjected to the condensation reaction in the manner described above, and then the condensation product formed is quaternized. In this case, at least a bimolar proportion of quaternizing agent is required to effect full quaternization of the condensation product.

It is also possible to condense equimolar proportions of an aldehyde of the Formula II and a quaternary salt of an aldehyde according to Formula II, whereby the product recovered from the reaction mixture will contain but one quaternary ammonium group.

The process according to the invention can also be effected by condensing two different aldehydes, each responding to general Formula II above; either of these aldehydes being employed either in the form represented by general Formula II above, containing a tertiary nitrogen atom, or in the form of a quaternary salt thereof. By this mode of execution there are obtained, among others, unsymmetrically constructed compounds. For example, by converting 6 - formyl-13-ethylidene-1,2,3a,4,5,6,6a,7-octahydro - 3,5-ethano-pyrrolo[2,3-d]carbazole by means of methyl iodide to the corresponding methiodide, and condensing the latter with 6-formyl-13-(2-hydroxyethylidene) - 1,2,3a,4,5,6,6a,7-octahydro-3,5-ethano-pyrrolo[2, 3-d]carbazole, there is obtained a compound responding to Formula I in which $R^1$ represents β-hydroxyethylidene; $R^2$ to $R^9$, inclusive, represent hydrogen; and $R^{10}$ represents ethylidene; and in which the 3'-nitrogen atom is present in its quaternized form as methiodide. The compound obtained, in virtue of the occurrence of the β-hydroxyethylidene radical, can be present in either the open form or the cyclized form; similar, respectively, to Formulas Ia and Ib above.

The products obtained by the processes of the invention can be purified by chromatography or crystallization, e.g. by way of their difficulty soluble diiodides or dipicrates.

The products obtained by the processes of the invention are crystalline compounds and are useful as medicinal agents. More particularly, the bases and acid addition salts are useful as sedatives, in virtue of their marked depressant action upon the central nervous system. The quaternary salts are useful as curarizing agents, in virtue of their curarimimetic activity.

The invention is further disclosed in the following examples, which are illustrative but not limitative thereof.

*Example 1*

100 mg. of 6-formyl-13-ethylidene-1,2,3a,4,5,6,6a,7-octahydro-3,5-ethano-pyrrolo[2,3-d]carbazole is dissolved in 10 ml. of benzene-carbon tetrachloride (1:1) and mixed with an excess of methyl iodide. After 5 minutes the precipitated methiodide is filtered with suction. The methiodide is dissolved in acetone-water (1:1) and charged to a column of Amberlite IRA–400 in the chloride ion form (a strongly basic polystyrene quaternary amine type anion exchanger). The thus obtained solution of the methochloride is evaporated to dryness in vacuo. The residue is chromatographed on cellulose powder, using water-saturated methyl ethyl ketone, with an addition of one volume percent of methanol, as the moving phase. The fractions determined by paper-chromatographic comparison to consist of pure 6-formyl-13 - ethylidene - 1,2,3a,4,5,6,6a,7 - octahydro-3,5-ethano-pyrrolo[2,3-d]carbazole-3-methochloride are consolidated and heated for 10 hours at 75° C. in 10 ml. of 5% acetic acid. After removing the solvent in vacuo, the reaction product is chromatographed on cellulose powder using the above identified moving phase. Those fractions which, according to their colour reaction with cerium(IV) sulfate solution and their paper chromatogram, comprise pure dihydro-toxiferin dichloride are consolidated and evaporated in vacuo. The residue is dissolved in 1 ml. of water and dihydrotoxiferin diiodide is precipitated with saturated aqueous sodium iodide solution.

The 6-formyl-13-ethylidene-1,2,3a,4,5,6,6a,7-octahydro-3,5-ethano-pyrrolo[2,3-d]carbazole used as starting material can be obtained in the following manner: 100 mg. of Wieland-Gumlich aldehyde [6-formyl-13-(2-hydroxyethylidene) - 1,2,3a,4,5,6,6a,7-octahydro-3,5-ethano-pyrrolo[2,3-d]carbazole] is dissolved in 1.5 ml. of 40% aqueous hydrobromic acid and 2 ml. of glacial acetic acid, mixed with 50 mg. of red phosphorus, and the mixture is heated under reflux on a boiling water bath for 3½ hours. Then the phosphorus is filtered off, the filtrate is diluted with 1.5 ml. of glacial acetic acid and reacted with 100 mg. of zinc dust for 30 minutes, while stirring vigorously. The excess zinc dust is filtered off and washed with a little glacial acetic acid. The combined filtrate and washings are adjusted to pH 8–9 with aqueous ammonia, and extracted several times with ether-methylene chloride (3:1). The combined extracts are dried over potassium carbonate and then evaporated to dryness in vacuo. In this manner, a total of 1.6 g. of Wieland-Gumlich aldehyde is reacted in 100 mg. portions. The combined crude products are chromatographed in benzene-methylene chloride (6:4) on 90 g. of aluminum oxide (Brockmann, 10% water). The 6-formyl-13-ethylidene-1,2,3a, 4,5,6,6a,7-octahydro-3,5-ethano-pyrrolo[2,3-d]carbazole is found in the first, non-crystallizing eluates. Distinction between these fractions and later fractions (which contain, in addition to unconverted Wieland-Gumlich aldehyde, still other products elutable with benzene-chloroform and chloroform) is made by means of infrared analysis.

Example 2

An equimolar mixture of 6-formyl-13-ethylidene-1,2, 3a,4,5,6,6a,7 - octahydro-3,5-ethano-pyrrolo[2,3-d]carbazole and 6-formyl-13-ethylidene-1,2,3a,4,5,6,6a,7-octahydro - 3,5-ethano-pyrrolo[2,3-d]carbazole-3-methochloride is heated for 10 hours in 5% acetic acid at 75° C., in the manner described in Example 1. Then the solution is evaporated to dryness, the residue is taken up in water and the solution is filtered through a column of Amberlite IRA–400 (chloride ion form). The residue obtained upon evaporation of the filtrate, which is a mixture of dihydrotoxiferin dichloride, bis-nordihydrotoxiferin dihydrochloride and nordihydrotoxiferin chloride hydrochloride, is separated chromatographically on a cellulose powder column by use of a mixture of ethyl acetate:pyridine:water (7.5:2.3:1.65). The two last named compounds (bisnor- and nor-compounds) upon further methylation yield dihydrotoxiferin dichloride.

Example 3

500 mg. of Wieland-Gumlich aldehyde [6-formyl-13-(2 - hydroxy-ethylidene)-1,2,3a,4,5,6,6a,7-octahydro-3,5-ethano-pyrrolo[2,3-d]carbazole], 1.1 g. of anhydrous sodium acetate and 35 ml. of glacial acetic acid, after careful degassing in a vacuum of less than 0.001 mm., are heated for 15 hours at 80° C. in a closed tube. Then the reaction mixture is evaporated to dryness in vacuo. The residue is taken up in water. The solution is made alkaline and is exhaustively extracted with chloroform. The chloroform solution is dried with potassium carbonate and then is evaporated to dryness. The residue is chromatographed on 42 g. of aluminum oxide (Brockmann, 12% water):

| Fractions | Solvent | Substance |
| --- | --- | --- |
| 1–3 | Benzene | 5.5 mg. forerun. |
| 4–16 | do | 222.8 mg. caracurin V. |
| 17–23 | do | 33.5 mg. mixture. |
| 24–30 | Benzene+20½ ether | 164 mg. Wieland-Gumlich aldehyde (crystalline). |

The caracurin V isolated from fractions 4–16 appears to be identical with the natural product in all characteristics. For example, it shows the following colour reactions:

With concentrated sulfuric acid—brownish
With 50% sulfuric acid—weak orange-brown
With ferric chloride-sulfuric acid—blue
With concentrated nitric acid—purple
With ceric sulfate-sulfuric acid—purple-red The hydrochloride and the picrate crystallize easily. The compound possesses the U.V. spectrum of an indoline derivative.

From the thus obtained caracurin V there is obtained, by treatment with acid, caracurin Va (nor-toxiferin I) and by quaternization of the latter in benzene with excess methyl iodide, while warming, there is obtained C-toxiferin diiodide. Caracurin V can also be converted to C-toxiferin in the following manner:

65 mg. of caracurin V is dissolved in a little benzene and mixed with an excess of methyl iodide. After one hour the mixture is filtered with suction. The precipitate is brought into solution with acetone-water. The solution is passed through a column of Amberlite IRA–400 (chloride form). The eluate is evaporated in vacuo. The residue, together with 5 ml. of pH 4.0 buffer (McIlvaine, 1:10 dilution), after careful degassing in a high vacuum, is heated for 24 hours at 80° C. in a closed tube. Then toxiferin dipicrate is precipitated with aqueous picric acid, washed carefully with water, and recrystallized from acetone-water.

Example 4

100 mg. of 6-formyl-13-ethylidene-1,2,3a,4,5,6,6a,7-octahydro-3,5-ethano-pyrrolo[2,3-d]carbazole is dissolved in 3 ml. of benzene and mixed with 6 ml. of pure methyl iodide. After 5 minutes at 20° C., the precipitated methiodide is sucked off, washed with ether, dried and converted to the chloride, in conventional manner, in an aqueous-actone solution passed through Amberlite IRA–400 (chloride form). The thus obtained amorphous chloride is taken up in a solution of 240 mg. of glacial acetic acid and 368 mg. of sodium acetate trihydrate in 4 ml. of water (pH 4.6), the reaction mixture is melted in a bomb tube under a good high vacuum, and finally heated at 70° C. for 4 hours. Then the mixture is diluted with 2 ml. of water and the picrate is precipitated by the addition of saturated sodium picrate solution, the precipitate is carefully washed with water and converted to chloride in known manner by use of Amberlite IRA–400. The thus obtained crude chloride, in solvent "C" [Helvetica Chimica Acta 41, 1269 (1958)], is subjected to partition chromatography on cellulose powder (Whatman No. 1), the eluates being checked by paper chromatography. The fractions containing the end product in practically pure form are recrystallized from methanol-ether, and yield a product having $[\alpha]_D^{20} = -599 \pm 4°$ (c.=0.583; 50% alcohol), which has the same biological activity as natural dihydrotoxiferin dichloride and yields nordihydrotoxiferin upon thermal decomposition.

Example 5

500 mg. of 6-formyl-13-(2-hydroxyethylidene)-1,2,3a, 4,5,6,6a,7 - octahydro-3,5-ethano-pyrrolo[2,3-d]carbazole methochloride and 1.0 g. of anhydrous sodium acetate are dissolved in 40 ml. of glacial acetic acid. The solution, after careful degassing in high vacuum, is heated in a closed tube for 15 hours in a water bath at 70° C. Then it is brought to dryness in vacuo. The residue is dissolved in water and the aqueous solution is passed through a column of Amberlite IRA–400 (chloride form) and then again evaporated in vacuo. The residue is dissolved in 10 ml. of glacial acetic acid, separated from undissolved sodium chloride, and to the filtrate is added 5 ml. of 0.08 M p-toluenesulfonic acid solution in glacial acetic acid. After being kept for 15 minutes at room temperature, the p-toluenesulfonic acid is neutralized with anhydrous soda. Then the mixture is evaporated to dryness in vacuo. The residue is taken up in a little water and the picrate is precipitated from the concentrated aqueous solution by means of aqueous picric acid, then washed carefully with water, and converted back to the chloride by means of an ion exchanger. The chloride mixture is saponified by treatment with 10 ml. of concentrated ammonia for 4 hours at room temperature. After evaporation there remains a yellowish residue, from which by crystallization in ethanol-methanol there is obtained pure crystalline C-toxiferin dichloride.

We claim:
1. A process which comprises condensing at a temperature between about 50° C. and about 100° C. a first aldehyde of the formula

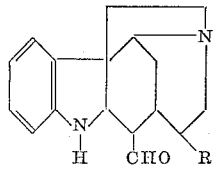

wherein R represents a member selected from the group consisting of ethylidene and hydroxyethylidene, with a second aldehyde of the same formula, by heating the aldehyde materials together, in the presence of an organic carboxylic acid selected from the group consisting of lower fatty acids and corresponding dicarboxylic acids thereby forming a compound of the formula:

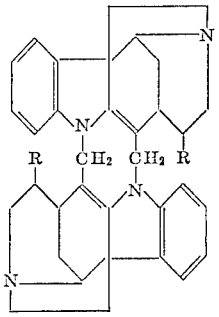

wherein each R has the same meaning as above.

2. A process according to claim 1 wherein said first aldehyde and said second aldehyde are identical.

3. A process according to claim 1 wherein said first aldehyde and said second aldehyde are different.

4. A process according to claim 1 which comprises an additional step of quaternizing at least one of the tertiary nitrogen atoms with a quaternizing agent selected from the group consisting of lower alkyl sulfates, lower alkenyl sulfates, aralkyl sulfates, lower alkyl halides, lower alkenyl halides and aralkyl halides.

5. A process according to claim 4 in which the quaternization step precedes the condensation step.

6. A process according to claim 4 in which the quaternization step succeeds the condensation step and the condensation product is diquaternized.

7. A process according to claim 5 in which only one of the two aldehyde reactants is subjected to the quaternization step prior to the condensation step.

8. A process which comprises heating at a temperature between about 50° C. and about 100° C. 6-formyl-13-ethylidene-1,2,3a,4,5,6,6a,7-octahydro-3,5-ethano-pyrrolo-[2,3-d]carbazole-3-methochloride in dilute aqueous acetic acid, thereby forming dihydrotoxiferin dichloride.

9. A process which comprises heating at a temperature between about 50° C. and about 100° C. 6-formyl-13-(2-hydroxy-ethylidene)-1,2,3a,4,5,6,6a,1 - octahydro - 3,5-ethano-pyrrolo[2,3-d]carbazole in glacial acetic acid-sodium acetate, thereby forming caracurin V.

References Cited in the file of this patent

Wieland et al.: Annalen der Chemie, vol. 494, page 191 (1932).

Degering: An Outline of Organic Nitrogen Compounds, p. 214 (1950).

Asmis et al.: Chem. Abstracts, vol. 49, pp. 15924–15926 (1955).

Bernauer et al.: Helvetica Chimica Acta, vol. 41, page 1409 (August 1958).

Bernauer et al.: Helvetica Chimica Acta, vol. 41, pages 2296, 2297, 2305 and 2307 (December 1958).

UNITED STATES PATENT OFFICE
CERTIFICATE OF CORRECTION

Patent No. 3,118,897                            January 21, 1964

Karl Bernauer et al.

It is hereby certified that error appears in the above numbered patent requiring correction and that the said Letters Patent should read as corrected below.

Column 2, line 65, for "β-hydroxyethlidene" read -- β-hydroxyethylidene --; column 5, in the table, second column, line 4 thereof, for "20½" read -- 20% --; column 8, line 16, for "-1,2,3a,4,5,6,6a,1-" read -- -1,2,3a,4,5,6,6a,7- --.

Signed and sealed this 7th day of July 1964.

(SEAL)
Attest:

ERNEST W. SWIDER                            EDWARD J. BRENNER
Attesting Officer                                 Commissioner of Patents